US012465473B2

(12) United States Patent
Park et al.

(10) Patent No.: US 12,465,473 B2
(45) Date of Patent: Nov. 11, 2025

(54) METHOD OF IMPROVING REPRODUCTIVE POTENTIAL OF MALE MAMMAL USING ULTRA-WEAK PHOTON

(71) Applicant: BIOLIGHT CORP, Gyeonggi-do (KR)

(72) Inventors: Mi-Jung Park, Seoul (KR); Won-You Lee, Namyangju-si (KR); Sang-Ik Yun, Seoul (KR); Hye-Lim Jang, Gunpo-si (KR)

(73) Assignee: BIOLIGHT CORP, Gyeonggi-do (KR)

( * ) Notice: Subject to any disclaimer, the term of this patent is extended or adjusted under 35 U.S.C. 154(b) by 1000 days.

(21) Appl. No.: 17/380,932

(22) Filed: Jul. 20, 2021

(65) Prior Publication Data

US 2021/0346139 A1 Nov. 11, 2021

Related U.S. Application Data

(63) Continuation of application No. PCT/KR2020/001024, filed on Jan. 21, 2020.

(30) Foreign Application Priority Data

Jan. 31, 2019 (KR) ........................ 10-2019-0012803

(51) Int. Cl.
*A61D 19/00* (2006.01)
*A61N 5/06* (2006.01)

(52) U.S. Cl.
CPC ........... *A61D 19/00* (2013.01); *A61N 5/0613* (2013.01); *A61N 2005/0662* (2013.01)

(58) Field of Classification Search
CPC ...... A61D 19/00; A61D 17/00; A61N 5/0613; A61N 2005/0662; A61N 2005/0636;
(Continued)

(56) References Cited

U.S. PATENT DOCUMENTS 6,379,939 B1 * 4/2002 Lubart ................. A61N 5/0613 435/2
10,104,875 B2 * 10/2018 Grajcar .................. A01K 31/22
(Continued)

OTHER PUBLICATIONS

Yeste M, Castillo-Martín M, Bonet S, Rodríguez-Gil JE. Impact of light irradiation on preservation and function of mammalian spermatozoa. Anim Reprod Sci. Jul. 2018;194:19-32. doi: 10.1016/j.anireprosci.2018.02.004. Epub Feb. 9, 2018. PMID: 29449037. (Year: 2018).*

(Continued)

*Primary Examiner* — Sunita Reddy
(74) *Attorney, Agent, or Firm* — Studebaker Brackett PLLC

(57) ABSTRACT

The present invention relates to a method of improving a reproductive potential of a male mammal using an ultra-weak photon. The ultra-weak photon according to the present invention is in a visible light spectrum but is transmitted as weak light that is not visually recognized so that the ultra-weak photon does not provoke stress and can be irradiated safely for a long time, thereby improving the reproductive potential of male mammals. Unlike an existing material feeding method of improving a reproductive potential, in which a material is supplied wastefully and environmental pollution problems are caused due to tolerance and misuse, the present invention relates to a useful alternative technology that can be used for a long time and ensure the sustainability of livestock industries.

6 Claims, 2 Drawing Sheets

(58) Field of Classification Search

CPC .... A61N 2005/0659; A61N 2005/0661; A61N 5/06; A61N 2005/0642; A61N 2005/0651; A01K 13/00

USPC .................................................... 600/33–35

See application file for complete search history.

(56) References Cited

U.S. PATENT DOCUMENTS

| | | | | |
|---|---|---|---|---|
| 11,058,889 | B1 * | 7/2021 | Suntych | A61N 5/062 |
| 2017/0142940 | A1 * | 5/2017 | Suntych | A01K 39/012 |
| 2017/0188573 | A1 * | 7/2017 | Codony Iglesias | A61N 5/0613 |
| 2017/0290124 | A1 | 10/2017 | Grajcar | |
| 2018/0125040 | A1 | 5/2018 | Grajcar et al. | |

OTHER PUBLICATIONS

Gabel CP, Carroll J, Harrison K. Sperm motility is enhanced by Low Level Laser and Light Emitting Diode photobiomodulation with a dose-dependent response and differential effects in fresh and frozen samples. Laser Ther. Jun. 30, 2018;27(2):131-136. doi: 10.5978/islsm.18-OR-13. PMID: 30087533. (Year: 2018).*

Alves et al., "Recovery of normal testicular temperature after scrotal heat stress in rams assessed by infrared thermography and its effects on seminal characteristics and testosterone blood serum concentration", Theriogenology, vol. 86, Issue 3,2016, pp. 795-805. (Year: 2016).*

Niggli HJ, Tudisco S, Privitera G, Applegate LA, Scordino A, Musumeci F. Laser-ultraviolet-A-induced ultraweak photon emission in mammalian cells. J Biomed Opt. Mar.-Apr. 2005;10(2):024006. doi: 10.1117/1.1899185. PMID: 15910080. (Year: 2005).*

Convert Lux to Watt/sq.Cm (at 555 Nm) by UnitConverters.net, Jan. 30, 2017 (see attached pdf) (Year: 2017).*

An Office Action mailed by the Korean Intellectual Property Office on Aug. 12, 2021, which corresponds to Korean Patent Application No. 10-2020-0007977 and is related to U.S. Appl. No. 17/380,932.

An Office Action; "Notice of Reasons for Refusal," mailed by the Japanese Patent Office on Feb. 10, 2025, which corresponds to Japanese Patent Application No. 2023-571427 and is related to U.S. Appl. No. 17/380,932.

Uktveris et al., "Application of Convolutional Neural Networks to Four-Class Motor Imagery Classification Problem", Information Technology and Control, vol. 46, No. 2, pp. 260-273, Jun. 6, 2017.

* cited by examiner

METHOD OF IMPROVING REPRODUCTIVE POTENTIAL OF MALE MAMMAL USING ULTRA-WEAK PHOTON

CROSS-REFERENCE TO RELATED APPLICATION

The present application is a continuation of International Patent Application No. PCT/KR2020/001024, filed Jan. 21, 2020, which is based upon and claims the benefit of priority to Korean Patent Application No. 10-2019-0012803, filed on Jan. 31, 2019. The present application further claims priority to and the benefit of Korean Patent Application No. 2020-0007977, filed on Jan. 21, 2020. The disclosures of the above-listed applications are hereby incorporated by reference herein in their entirety.

BACKGROUND

1. Field of the Invention

The present invention relates to a method of improving a reproductive potential of a male mammal using an ultra-weak photon.

2. Discussion of Related Art

An ultra-weak photon refers to weak light which has a polychromatic wavelength in a visible light spectrum and whose irradiance corresponds to 1/500,000 of the brightness of a general fluorescent lamp.

An ultra-weak photon is at least 1,000 times weaker than bioluminescence and thus has high efficiency and safety. The possibility of the fact that an ultra-weak photon affects living things was first raised by Gurvich in the former Soviet Union in the 1930s, and then, the German photobiologist Popp published an experimental result that information exchange between cells takes place through an ultra-weak photon. Based on such a background, an ultra-weak photon was researched for many years by irradiating living things with the ultra-weak photon, and as a result, the safety and usefulness thereof were confirmed.

Meanwhile, among mature animals, males have sexual desire and mating ability and have an ability to make females pregnant by producing sperm with viability and fertility, and a condition in which such reproductive potential is temporarily or continuously impaired is referred to as reproductive impairment. Among them, thermoregulation is known to have a profound effect on male reproductive potential.

In particular, pigs have a high mean body temperature of about 39° C., have a thick subcutaneous fat layer, and have no sweat glands so that the pigs can withstand the cold in winter to some extent. However, when the environmental temperature rises to 25° C. or higher, a function of controlling body hormones is weakened, and thus, the pigs are subjected to great high-temperature stress due to the hot and humid summer weather of Korea. The high-temperature stress in summer also affects reproductive organs, and as a symptom of the high-temperature stress, estrus is delayed or a production amount and quality of semen drop sharply.

Therefore, for high reproduction and productivity of mammals, not only the health of females should be good, but also the quality of sperm of males should be high. Therefore, there is a need for a management method which is capable of improving an overall production amount and quality of semen of males and also minimizing a decrease in reproductive potential due to high-temperature stress in summer.

SUMMARY

While the present inventors were researching an eco-friendly and safe improvement in reproductive potential of male mammals, the present inventors confirmed that use of an ultra-weak light considerably improved a production amount and quality of semen (concentration, agglutination, sperm motility, sperm survival rate, and the like) of male mammals so that the reproductive potential of male mammals was considerably improved through a noninvasive method of irradiating the ultra-weak photon, thereby completing the present invention.

Therefore, the present invention is directed to providing a method of improving a reproductive potential of a male mammal, which includes irradiating a male mammal with an ultra-weak photon.

According to an aspect of the present invention, there is provided a method of improving a reproductive potential of a male mammal excluding a human, the method including irradiating a male mammal excluding a human with an ultra-weak photon.

The ultra-weak photon may have a wavelength of 300 nm to 870 nm.

A light source having an irradiance of 10' $W/cm^2$ to 10' $W/cm^2$ may be used for irradiating the ultra-weak photon.

The ultra-weak photon may be irradiated for 24 hours a day.

The ultra-weak photon may increase a production amount and quality of semen of the male mammal. In this case, the male mammal may be a male mammal subjected to high-temperature stress. Here, the male mammal may be, for example, any one selected from among a pig, a goat, a sheep, a dairy cow, a cow, a horse, a deer, a roe deer, a dog, a cat, a two-humped camel, a rhinoceros, a hippopotamus, a giraffe, an elephant, a bear, a tiger, a lion, a leopard, a hyena, a badger, a fox, a wolf, a weasel, a rat, a squirrel, a hamster, a guinea pig, a beaver, a rabbit, a koala, a kangaroo, a monkey, a chimpanzee, and an orangutan.

The ultra-weak photon may be irradiated at a distance of 1 m to 5 m from a male mammal.

According to another aspect of the present invention, there is provided a method of increasing a production amount of sperm or semen of a male mammal, the method including irradiating a male mammal excluding a human with an ultra-weak photon.

According to still another aspect of the present invention, there is provided a method of reducing a disposal of semen derived from a male mammal, the method including irradiating a male mammal excluding a human with an ultra-weak photon.

DETAILED DESCRIPTION

Figure 1:
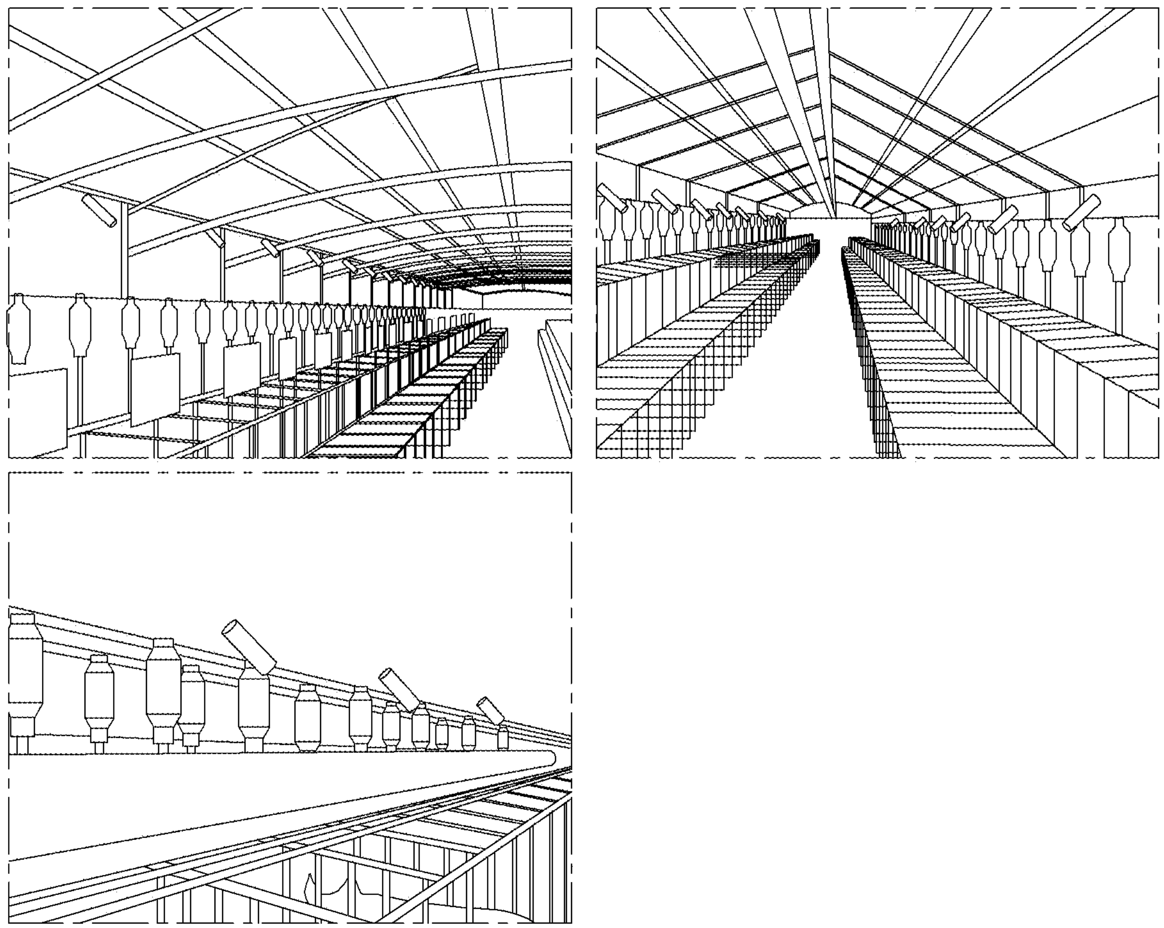
FIGS. 1 and 2 show images showing an installation state of light irradiators (PHOTONIA) for generating an ultra-weak photon of the present invention in a pig house.

The present invention provides a method of improving a reproductive potential of a male mammal excluding a human, which includes irradiating a male mammal excluding a human with an ultra-weak photon.

The ultra-weak photon is a type of light useful for living things, and the light useful for living things refers to light that is incident on living things and has positive effects on living things, such as activation of biometabolism, improvement of immunity, promotion of cell growth, and the like. The ultra-weak photon has characteristics such as polychromatic, coherence, visible range, and polarized characteristics.

Since irradiance of an ultra-weak photon generated from living things is very weak, ultra-weak photon emission is referred to as ultra-weak photon emission or biophoton emission. The biophoton emission is related to reactive oxygen species (ROS) that occurs in a normal metabolic process of living things. The ROS is formed of natural by-products from normal metabolism of oxygen and plays important role in cellular signaling and homeostasis.

When nutrients are digested and absorbed by living things and oxygen is inhaled, the nutrients absorbed by living organisms and the inhaled oxygen are transported to tissue cells of the entire body. Mitochondria within the cells obtain adenosine triphosphate (ATP) energy based on the nutrients and oxygen transported to the tissue cells. In living things, such ATP energy is used to produce proteins (enzymes, hormones, and the like), maintain homeostasis, regulate metabolism, perform immune functions, and regulate reactive oxygen. Accordingly, when living things are irradiated with an ultra-weak photon, electrons may be provided to an electron transfer system (ETS) that produces ATP energy in mitochondria, thereby increasing ATP energy production, and the providing of electrons may reduce an ROS from being generated in the ETS. That is, when living things are irradiated with an ultra-weak photon having characteristics similar to those of a biophoton, the ultra-weak photon is transmitted to the living things through resonance absorption between the ultra-weak photon and the living things and used in the living things.

In the present invention, the ultra-weak photon may have a wavelength of 300 nm to 870 nm. In one embodiment of the present invention, the ultra-weak photon has a wavelength of 380 nm to 780 nm, a peak wavelength is 704.47 nm, a centroid wavelength is 676.10 nm, and a dominant wavelength of 588.45 nm.

In addition, in the present invention, the ultra-weak photon may have an irradiance of $10^{-}18$ W/cm$^2$ to $10^{-13}$ W/cm$^2$ and more preferably have an irradiance of $10^{-15}$ W/cm$^2$ to $10^{-13}$ W/cm$^2$. Any type of light source may be provided without limitation as long as the light source can satisfy the irradiance and can irradiate the ultra-weak photon for a long time without side effects. Preferably, the light source may include a laser, a light-emitting diode (LED) light source, and the like which are used for phototherapy.

In the present invention, the ultra-weak photon may be irradiated for 24 hours a day.

In addition, in the present invention, the ultra-weak photon may be preferably irradiated at a distance of 1 m to 5 m from a male mammal.

Furthermore, in the present invention, the ultra-weak photon may increase a production amount and quality of sperm. The quality of sperm refers to sperm concentration, sperm agglutination, sperm motility, sperm survival rate, and like, but the present invention is not limited thereto.

Meanwhile, it is generally known that, when males are exposed to heat stress or have body heat, a semen amount is decreased and semen quality is degraded. In particular, a semen volume and a semen concentration of male pigs are known to be decreased in summer. In particular, a semen survival rate and semen motility are known to be the lowest in August, and thus, in the following experiments, reproductive potential was investigated by representatively using male pigs.

Therefore, the ultra-weak photon of the present invention is irradiated for 24 hours and 12 months to improve a production amount and quality of sperm, thereby achieving an effect of improving reproductive potential. In particular, male mammals subjected to high-temperature stress are irradiated with the ultra-weak photon, thereby achieving an effect of increasing a production amount and quality of sperm. The high-temperature stress refers to stress received by male mammals due to an environmental temperature of 25° C. or higher.

In this case, the male mammal is, for example, any one selected from among a pig, a goat, a sheep, a dairy cow, a cow, a horse, a deer, a roe deer, a dog, a cat, a two-humped camel, a rhinoceros, a hippopotamus, a giraffe, an elephant, a bear, a tiger, a lion, a leopard, a hyena, a badger, a fox, a wolf, a weasel, a rat, a squirrel, a hamster, a guinea pig, a beaver, a rabbit, a koala, a kangaroo, a monkey, a chimpanzee, and an orangutan, but the present invention may be applied without being limited thereto.

Specifically, in one embodiment of the present invention, when male pigs were irradiated with an ultra-weak photon for 24 hours a day, it was confirmed that a production amount of a semen was increased by a mean of 8.73 bottles/per collection in summer (August) and was increased by a mean of 3.75 bottles/per collection in an entire treatment period (from August to November). In addition, after irradiation of the ultra-weak photon, as compared with a control group, a total sperm count and a total sperm count for each head were increased, and a semen disposal rate was significantly reduced due to excellent semen production.

That is, unlike that of other light sources that can be used only for a short time during bio-irradiation, a method of improving a reproductive potential of a mammal according to the present invention can be used 24 hours a day to improve reproductive potential of male mammals in an eco-friendly and safe manner, thereby considerably improving offspring productivity.

In addition, the present invention provides a method of increasing a production amount of sperm or semen of a male mammal or a method of reducing a disposal of semen derived from a male mammal, which includes irradiating a male mammal excluding a human with an ultra-weak photon.

Hereinafter, the present invention will be described in more detail through the following Experimental Examples and Examples. However, the following Experimental Examples and Examples are merely provided for the purpose of illustration for a better understanding of the present invention but are not intended to limit the spirit and scope of the present invention.

Examples 1 to 3: Selection of Ultra-Weak Photon Source of the Present Invention In order to select an optimal light source for irradiating male pigs with an ultra-weak photon, a spectroscopic analysis was performed on three different ultra-weak photon sources. Results of the spectroscopic analysis are shown in Table 1 below.

TABLE 1

| | Example 1 | Example 2 | Example 3 |
|---|---|---|---|
| Type | CFL | LED | LED |
| Spectral range | 380 nm to 780 nm | 380 nm to 780 nm | 380 nm to 780 nm |
| Dominant WL | 585.13 nm | 588.45 nm | 587.83 nm |
| Irradiance | $4.282 \times 10^{-10}$ W/cm$^2$ | $52.39 \times 10^{-10}$ W/cm$^2$ | $29.06 \times 10^{-10}$ W/cm$^2$ |
| Lumen maintenance rate | 85% | 90% | 90% |
| Luminous efficiency | 64.50 lm/W | 85 lm/W | 80 lm/W |

Based on the above results, a modulated LED for an ultra-weak photon of Example 2 having a wavelength of 380 nm to 780 nm as a dominant wavelength length, a lumen maintenance rate of 90%, and a luminous efficiency of 85 lm/W was selected and used for breeding male pigs.

In this case, light sources of Examples 1 to 3 had an irradiance that is too weak for a value to be measured using a spectrometer, and thus, an irradiance value was measured 2 cm in front of a cross section of an end of a light irradiator. Meanwhile, since irradiance of light is attenuated in inverse proportion to (distance), a light irradiator was installed at a radius of about 2 m from male mammals when actually installed in a pig house. In this case, it was confirmed that a final irradiance of a light source was in a range of $1\times10^{-15}$ W/cm$^2$ to $1\times10^{-13}$ W/cm$^2$.

Example 4: Irradiation of Male Mammals with Ultra-Weak Photon

Figure 2:
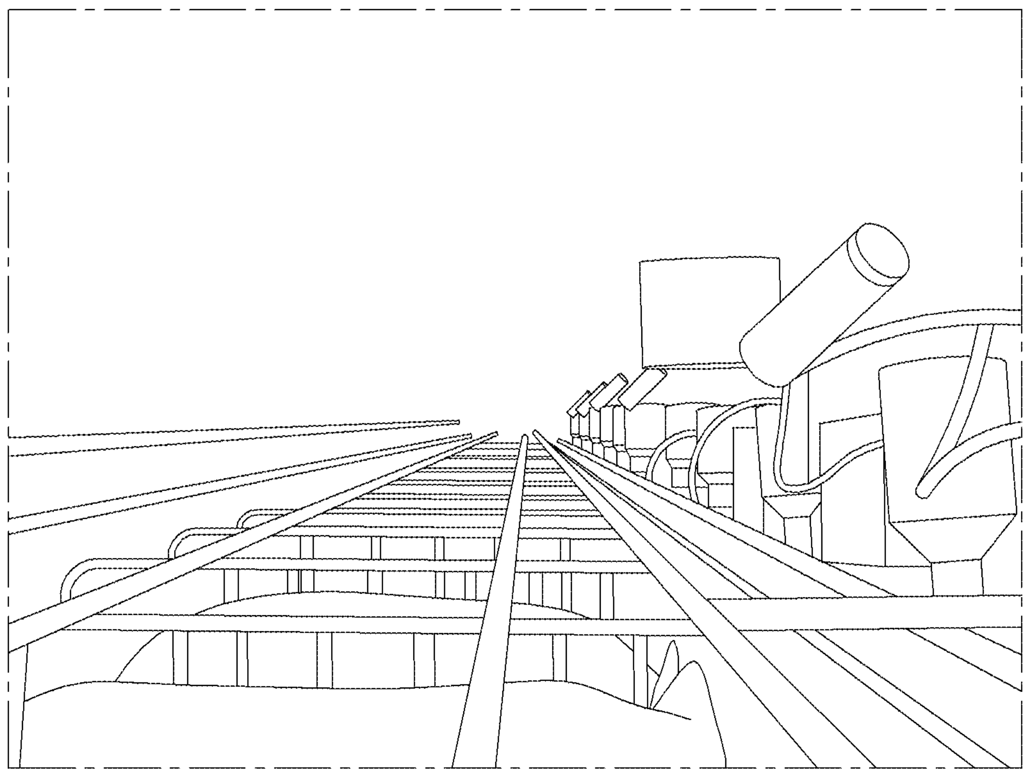

Landrace breed male pigs were used as male pigs and bred from July 1 to Nov. 30, 2018 in a male pig house of a pig artificial insemination center (AI center) (in Chungju, Chungcheongbuk-do, Korea). One light irradiator (PHOTONIA manufactured by Biolight Corporation in Korea) for generating an ultra-weak photon of the present invention was installed per two head in the male pig house using a separate cradle, a feeding pipe, a ceiling structure, and the like. A separate individual circuit breaker (220 v/60 Hz) was installed along with the light irradiator. An installation state of the light irradiators in a pig house is shown in FIGS. 1 and 2.

An experiment was performed by dividing the male pigs into 37 head of a control group and 15 head of an experimental group. The experimental group was continuously irradiated with the ultra-weak photon of Example 2 for 24 hours a day during an experiment, and a distance (irradiation distance) of the light irradiator from the male pig was maintained within about 2 m.

Experimental Example 1: Analysis of Reproductive Potential of Male Mammals Before and after Irradiation of Ultra-Weak Photon—August, 2018

Breeding performance according to an amount, a concentration, and agglutination of semen of male pigs raised according to a method of Example 4 was checked to analyze reproductive potential according to irradiation of an ultra-weak photon. Results of the analysis are shown in Tables 2 and 3 below. Meanwhile, N represents the number of times of semen collections in a control group and an experimental group.

TABLE 2

| Group statistics | | | | | |
|---|---|---|---|---|---|
| | | N | Mean | Standard deviation | Standard error mean |
| Amount of semen | Experimental group | 58 | 222.24 | 68.333 | 8.973 |
| | Control group | 165 | 176.88 | 68.507 | 5.333 |
| Concentration | Experimental group | 58 | 8.40 | 3.072 | 0.403 |
| | Control group | 165 | 9.60 | 4.435 | 0.345 |
| Agglutination | Experimental group | 58 | 2.78 | 0.497 | 0.065 |
| | Control group | 165 | 2.79 | 0.649 | 0.050 |
| Number of production bottles | Experimental group | 58 | 65.78 | 22.174 | 2.912 |
| | Control group | 165 | 57.05 | 22.293 | 1.735 |

TABLE 3

| Independent sample test | | | | | | | | | | |
|---|---|---|---|---|---|---|---|---|---|---|
| | | Levene's equal variance test | | T test for equality of means | | | | | | |
| | | | | | | | | | 95% confidence interval of difference | |
| | | F | Significance probability | t | Degrees of freedom | Significance probability (both sides) | Mean difference | Standard error difference | Lower limit | Upper limit |
| Amount of semen | Assumption of equal variance | 0.182 | 0.670 | 4.340 | 221 | 0.000 | 45.357 | 10.451 | 24.761 | 65.952 |
| | No assumption of equal variance | | | 4.345 | 100.051 | 0.000 | 45.357 | 10.438 | 24.648 | 66.065 |
| Concentration | Assumption of equal variance | 9.893 | 0.002 | −1.902 | 221 | 0.058 | −1.198 | 0.630 | −2.440 | 0.043 |
| | No assumption of equal variance | | | −2.257 | 144.206 | 0.026 | −1.198 | 0.531 | −2.248 | −0.149 |
| Agglutination | Assumption of equal variance | 3.458 | 0.064 | −0.193 | 221 | 0.847 | −0.018 | 0.094 | −0.203 | 0.166 |
| | No assumption of equal variance | | | −0.219 | 129.510 | 0.827 | −0.018 | 0.083 | −0.181 | 0.145 |

TABLE 3-continued

Independent sample test

| | | Levene's equal variance test F | Levene's equal variance test Significance probability | T test for equality of means t | Degrees of freedom | Significance probability (both sides) | Mean difference | Standard error difference | 95% confidence interval of difference Lower limit | 95% confidence interval of difference Upper limit |
|---|---|---|---|---|---|---|---|---|---|---|
| Number of production bottles | Assumption of equal variance | 0.297 | 0.587 | 2.568 | 221 | 0.011 | 8.727 | 3.398 | 2.030 | 15.425 |
| | No assumption of equal variance | | | 2.575 | 100.299 | 0.011 | 8.727 | 3.390 | 2.003 | 15.452 |

As shown in Tables 2 and 3, it was confirmed that a production amount and quality of semen in August after irradiation of the ultra-weak photon were considerably improved. In particular, it was confirmed that the production amount of semen was increased by a mean of 8.73 bottles/per collection.

Experimental Example 2: Analysis of Reproductive Potential of Male Mammals Before and after Irradiation of Ultra-Weak Photon—August to November, 2018

Breeding performance according to an amount, a concentration, and agglutination of semen of male pigs raised according to a method of Example 4 was checked to analyze reproductive potential according to irradiation of an ultra-weak photon. Results of the analysis are shown in Tables 4 and 5 below. Meanwhile, N represents the number of times of semen collections in a control group and an experimental group.

TABLE 4

Group statistics

| | Treatment/control group | N | Mean | Standard deviation | Standard error mean |
|---|---|---|---|---|---|
| Amount of semen | Experimental group | 244 | 237.90 | 76.419 | 4.892 |
| | Control group | 622 | 201.17 | 77.150 | 3.093 |
| Concentration | Experimental group | 244 | 7.95 | 3.063 | 0.196 |
| | Control group | 622 | 9.29 | 4.318 | 0.173 |
| Agglutination | Experimental group | 244 | 2.75 | 0.502 | 0.032 |
| | Control group | 622 | 2.87 | 1.362 | 0.055 |
| Number of production bottles | Experimental group | 244 | 66.26 | 22.776 | 1.458 |
| | Control group | 622 | 62.51 | 24.094 | 0.966 |

TABLE 5

Independent sample test

| | | Levene's equal variance test F | Levene's equal variance test Significance probability | T test for equality of means t | Degree of freedom | Significance probability (both sides) | Mean difference | Standard error difference | 95% confidence interval of difference Lower limit | 95% confidence interval of difference Upper limit |
|---|---|---|---|---|---|---|---|---|---|---|
| Amount of semen | Assumption of equal variance | 0.020 | 0.888 | 6.319 | 864 | 0.000 | 36.730 | 5.812 | 25.322 | 48.138 |
| | No assumption of equal variance | | | 6.346 | 448.129 | 0.000 | 36.730 | 5.788 | 25.354 | 48.105 |
| Concentration | Assumption of equal variance | 32.091 | 0.000 | −4.419 | 864 | 0.000 | −1.337 | 0.303 | −1.931 | −0.743 |
| | No assumption of equal variance | | | −5.111 | 621.708 | 0.000 | −1.337 | 0.262 | −1.851 | −0.823 |
| Agglutination | Assumption of equal variance | 1.434 | 0.231 | −1.275 | 864 | 0.203 | −0.114 | 0.089 | −0.290 | 0.062 |
| | No assumption of equal variance | | | −1.801 | 861.572 | 0.072 | −0.114 | 0.063 | −0.238 | 0.010 |
| Number of production bottles | Assumption of equal variance | 0.005 | 0.943 | 2.090 | 864 | 0.037 | 3.747 | 1.793 | 0.229 | 7.265 |
| | No assumption of equal variance | | | 2.142 | 467.910 | 0.033 | 3.747 | 1.749 | 0.310 | 7.184 |

As shown in Tables 4 and 5, it was confirmed that a production amount and quality of semen from August to November after irradiation of the ultra-weak photon were considerably improved. In particular, it was confirmed that the production amount of semen was increased by a mean of 3.75 bottles/per collection.

Experimental Example 3: Analysis of Reproductive Potential of Male Mammals Before and after Irradiation of Ultra-Weak Photon—January to November, 2019

Landrace breed male pigs were used as male pigs and bred from July 1 to Nov. 30, 2019 in a male pig house of an AL center (in Chungju, Chungcheongbuk-do, Korea). One light irradiator (PHOTONIA manufactured by Biolight Corporation in Korea) for generating an ultra-weak photon of the present invention was installed per one head in the male pig house using a separate cradle, a feeding pipe, a ceiling structure, and the like.

An experiment was performed by dividing the male pigs into 35 head of a control group and 37 head of an experimental group. The experimental group was continuously irradiated with the ultra-weak photon of Example 2 for 24 hours a day during an experiment, and a distance (irradiation distance) of the light irradiator from the male pig was maintained within about 2 m. Tables 6 and 7 below show results of measuring a production amount of semen and a semen disposal rate according to ultra-weak photon treatment. The control group was treated using a general light source that is generally used on farms.

As shown in Tables 6 and 7, as a result of irradiating male pigs with an ultra-weak photon, the proportion of semen discarded due to a decrease in sperm motility due to seasonal stress caused by hot weather in July and August was generally increased. However, in the experimental group, among 410 cases, 7 cases, that is, only 1.7% was discarded, and as a result, the semen of only 4 head among 37 head is discarded. On the other hand, in the control group, among 344 cases, 25 cases were discarded, and as a result, the semen of 9 head among 35 head is discarded. This means that, in the control group, more individuals with poor health and more semen with decreased motility were produced.

As confirmed above, according to a method of improving a reproductive potential of a male mammal according to the present invention, it is possible to improve the overall production amount and quality of semen of male mammals and to minimize reproductive potential from being degraded due to high-temperature stress in summer. In addition, due to use of an ultra-weak photon which can be safely used for a long period of time and can be continuously irradiated, it was confirmed that the pig productivity could be improved in an economical and eco-friendly manner by lowering farm personnel manpower and also significantly improving the reproductive potential of male mammals.

An ultra-weak photon according to the present invention is in a visible light spectrum but is transmitted as weak light that is not visually recognized so that the ultra-weak photon does not provoke stress and can be irradiated safely for a long time, thereby improving the reproductive potential of male mammals. Unlike an existing material feeding method of improving a reproductive potential, in which a material is supplied wastefully and environmental pollution problems are caused due to tolerance and misuse, the present invention relates to a useful alternative technology that can be used for a long time and ensure the sustainability of livestock industries. The useful alternative technology is a simple, practical, and eco-friendly method and is applied to smart farming to safely improve the reproductive potential of male mammals, thereby considerably improving the productivity of farmhouses.

TABLE 6

| | Treatment group | | | | Control group | | | |
|---|---|---|---|---|---|---|---|---|
| Month | Total sperm count | Number of head | Total sperm count per head | Number of production bottles per head | Total sperm count | Number of head | Total sperm count per head | Number of production bottles per head |
| January | 135,470 | 37 | 3,661 | 183 | 134,127 | 35 | 3,832 | 192 |
| February | 146,516 | 37 | 3,960 | 198 | 137,171 | 35 | 3,919 | 196 |
| March | 164,897 | 37 | 4,457 | 223 | 176,085 | 35 | 5,031 | 252 |
| April | 165,961 | 37 | 4,485 | 224 | 157,689 | 35 | 4,505 | 225 |
| May | 142,343 | 37 | 3,847 | 192 | 120,797 | 35 | 3,451 | 173 |
| June | 141,864 | 37 | 3,834 | 192 | 136,489 | 35 | 3,900 | 195 |
| Mean before treatment | 149,509 | 37 | 4,041 | 202 | 143,726 | 35 | 4,106 | 205 |
| Treatment month of July | 156,622 | 37 | 4,233 | 212 | 143,362 | 35 | 4,096 | 205 |
| April | 134,028 | 37 | 3,622 | 181 | 126,565 | 35 | 3,616 | 181 |
| September | 173,377 | 37 | 4,686 | 234 | 128,614 | 35 | 3,675 | 184 |
| October | 140,156 | 37 | 3,788 | 189 | 114,171 | 35 | 3,262 | 163 |
| November | 135,022 | 37 | 3,649 | 182 | 123,774 | 35 | 3,536 | 177 |
| Mean after treatment | 145,646 | 37 | 3,936 | 197 | 123,281 | 35 | 3,522 | 176 |

TABLE 7

| | Semen disposal rate | | | |
|---|---|---|---|---|
| | Experimental group | | Control group | |
| Before | 845 cases | n = 37 | 795 cases | n = 35 |
| treatment | 11 cases (1.3%) | n = 7 (18.9%) | 11 cases (1.4%) | n = 7 (20%) |
| After | 410 cases | n = 37 | 344 cases | n = 35 |
| treatment | 7 cases (1.7%) | n = 4 (10.8%) | 15 cases (4.4%) | n = 9 (25.7%) |

What is claimed is:

1. A method of improving a reproductive potential of a male mammal excluding a human, the method comprising:

irradiating the male mammal excluding the human with an ultra-weak photon having a wavelength of 380 nm (nanometer) to 870 nm, a centroid wavelength of 676.10 nm, by using a LED (light-emitting diode) light source having an irradiance of $10^{-18}$ W/cm$^2$ (Watts per square centimeter) to $10^{-13}$ W/cm$^2$, a lumen maintenance rate of 90%, and a luminous efficiency of 85 lm/W (lumen per Watt), at a distance of 1 m to 5 m from the male mammal; wherein the ultra-weak photon is irradiated for 24 hours a day.

2. The method of claim 1, wherein the ultra-weak photon increases a production amount and quality of semen of the male mammal.

3. The method of claim 2, wherein the male mammal is subjected to high-temperature stress.

4. The method of claim 3, wherein the male mammal is any one selected from among a pig, a goat, a sheep, a dairy cow, a cow, a horse, a deer, a roe deer, a dog, a cat, a two-humped camel, a rhinoceros, a hippopotamus, a giraffe, an elephant, a bear, a tiger, a lion, a leopard, a hyena, a badger, a fox, a wolf, a weasel, a rat, a squirrel, a hamster, a guinea pig, a beaver, a rabbit, a koala, a kangaroo, a monkey, a chimpanzee, and an orangutan.

5. A method of increasing a production amount of sperm or semen of a male mammal, the method comprising irradiating the male mammal excluding the human with an ultra-weak photon having a wavelength of 380 nm (nanometer) to 870 nm, a centroid wavelength of 676.10 nm, by using a LED (light-emitting diode) light source having an irradiance of $10^{-18}$ W/cm$^2$ (Watts per square centimeter) to $10^{-13}$ W/cm$^2$, a lumen maintenance rate of 90%, and a luminous efficiency of 85 lm/W (lumen per Watt), at a distance of 1 m to 5 m from the male mammal; wherein the ultra-weak photon is irradiated for 24 hours a day.

6. A method of reducing a waste of semen derived from a male mammal, the method comprising irradiating the male mammal excluding the human with an ultra-weak photon having a wavelength of 380 nm (nanometer) to 870 nm, a centroid wavelength of 676.10 nm, by using a LED (light-emitting diode) light source having an irradiance of $10^{-18}$ W/cm$^2$ (Watts per square centimeter) to $10^{-13}$ W/cm$^2$, a lumen maintenance rate of 90%, and a luminous efficiency of 85 lm/W (lumen per Watt), at a distance of 1 m to 5 m from the male mammal; wherein the ultra-weak photon is irradiated for 24 hours a day.

* * * * *